(12) United States Patent
Kosatka-Pioro et al.

(10) Patent No.: US 9,191,507 B2
(45) Date of Patent: Nov. 17, 2015

(54) APPARATUS AND METHOD FOR NETWORK INITIATED REDIAL

(71) Applicant: Aleksandra Kosatka-Pioro, Lutomiersk (PL)

(72) Inventors: Aleksandra Kosatka-Pioro, Lutomiersk (PL); Krzysztof Pioro, Lutomiersk (PL)

(73) Assignee: Aleksandra Kosatka-Pioro, Lutomiersk (PL)

( * ) Notice: Subject to any disclaimer, the term of this patent is extended or adjusted under 35 U.S.C. 154(b) by 96 days.

(21) Appl. No.: 14/142,858

(22) Filed: Dec. 29, 2013

(65) Prior Publication Data

US 2015/0079951 A1  Mar. 19, 2015

(30) Foreign Application Priority Data

Sep. 14, 2013 (EP) .................................. 13461548

(51) Int. Cl.
*H04M 3/48* (2006.01)
*H04M 3/42* (2006.01)

(52) U.S. Cl.
CPC *H04M 3/48* (2013.01); *H04M 3/42* (2013.01); *H04M 3/42059* (2013.01); *H04M 3/42102* (2013.01); *H04M 3/42195* (2013.01)

(58) Field of Classification Search
None
See application file for complete search history.

(56) References Cited

U.S. PATENT DOCUMENTS

| 8,582,745 | B1* | 11/2013 | Chitnis et al. | 379/207.05 |
| 8,649,500 | B1* | 2/2014 | Cohen et al. | 379/266.07 |
| 8,755,502 | B1* | 6/2014 | Schlesener | H04M 3/42 455/445 |
| 2006/0160531 | A1* | 7/2006 | Park | H04M 3/48 455/418 |
| 2007/0121831 | A1* | 5/2007 | Kim et al. | 379/93.31 |

* cited by examiner

*Primary Examiner* — Lester Kincaid
*Assistant Examiner* — Daniel G Bassett
(74) *Attorney, Agent, or Firm* — Mark M. Friedman

(57) ABSTRACT

A method for network initiated redial comprising the steps of receiving, at a network subsystem, from a first mobile device a request to establish a first call with a second mobile device at a time T0; notifying the first mobile device about an unsuccessful attempt of establishing the first call with the second mobile device; the method further comprises the step of registering, at the network subsystem, an unsuccessful first call attempt between the first mobile device and the second mobile device at a time T0; receiving, at a network subsystem, from the second mobile device a request to establish a second call with the first mobile device at a time T3; notifying the second mobile device about an unsuccessful attempt of establishing a second call with the first mobile device; registering, at the network subsystem, an unsuccessful second call attempt between the second mobile device and the first mobile device at a time T3; verifying whether there occurred a simultaneous or substantially simultaneous calls situation between the first call and the second call; establishing a network initiated call between the first mobile device and the second mobile device when there occurred a simultaneous or substantially simultaneous calls situation between the first call and the second call.

6 Claims, 3 Drawing Sheets

APPARATUS AND METHOD FOR NETWORK INITIATED REDIAL

BACKGROUND OF THE INVENTION

1. Field of the Invention

The object of the present invention is an apparatus and method for network initiated redial. The method finds its application in communication systems such as telephones, videoconferencing systems or the like wherein two users/mobile devices establish a communication channel between each other.

2. Description of the Related Art

The present invention concerns improving the ease of use with respect to redial operations when two persons/mobile devices are trying to connect to each other at the same or substantially the same time.

Such substantially simultaneous connection situation frequently occurs when, for example at least one mobile device looses access to the network, a client mobile device freezes and needs a reboot, a network error occurs during connection, a low battery condition occurs or similar, followed by an immediate simultaneous redial of both persons or mobile devices.

Another possible cause of a simultaneous dialing may occur when one person tries to call another who does not pick up the call. The caller retries while the recipient having noticed an unanswered call tries to call back simultaneously with the first person's redial.

Yet another plausible cause of a simultaneous dialing may occur when two persons or mobile devices try to call each other accidentally at the same time, for example at a set time of a meeting or at a time of frequent calls such as new year's eve.

Prior art patent publication U.S. Pat. No. 7,319,861 B2 entitled "Network initiated auto-redial" discloses network initiated auto redialing, which is based on an auto redial duration selected or entered by a calling party. An auto redial interval or retry rate may also be selected or entered by the calling party. If the calling party is unavailable when a connection is established with a called party, a message is played or sent to the called party explaining that the call is an auto redial call. The message may explain that the calling party is now unavailable. Additionally, the message may include identifying information regarding the calling party. For example, the message may include a directory number of the calling party.

This publication concerns a typical callback when busy. If a user has such service enabled and receives a busy signal, the network will try to redial the other party for a predefined period of time. Therefore it would not apply to a situation of substantially simultaneous dialing by both parties.

Typically such redial approach will takes longer to succeed because it does not take into account the state of the other party when attempting a redial operation.

U.S. Pat. No. 6,169,786 B1 discloses a method for redialing in telecommunication networks for a callback when the line is not busy. If a caller attempts a call to reach a called subscriber, but the subscriber initially does not answer the call, then a redial function is automatically performed by the telecommunication network in predetermined time intervals within a predetermined time window.

Another prior art patent publication U.S. Pat. No. 7,469,044 B2 entitled "Callback when not engaged by means of automated redialing in communication network" discloses a method of redialing in telecommunication networks for a call back when not engaged, whereby a caller carries out a call attempt to reach a callee, whereby the callee does not respond at first. According to the presented apparatus and method, the callee may be reached without the caller having to continually undertake a further call attempt, whereby a radialling is automatically carried out by the relevant exchange within a given time window at given time periods and a connection to the callee is established should the same respond.

This method concerns performing a redial for a callback when not busy in telecommunications networks, which operate independently of the used telecommunication network and the telecommunication mobile device. This, however does not address a situation when both users or mobile devices are engaged with dialing each other simultaneously or substantially simultaneously and none of them may succeed.

Taking into account the foregoing prior art, there is a need to design and implement an improved apparatus and method for network initiated redial especially applicable to situations of simultaneous or substantially simultaneous dialing by both parties/mobile devices.

SUMMARY OF THE INVENTION

There is presented a method for network initiated redial comprising the steps of receiving, at a network subsystem, from a first mobile device a request to establish a first call with a second mobile device at a time T0; notifying the first mobile device about an unsuccessful attempt of establishing the first call with the second mobile device; the method further comprises the step of registering, at the network subsystem, an unsuccessful first call attempt between the first mobile device and the second mobile device at a time T0; receiving, at a network subsystem, from the second mobile device a request to establish a second call with the first mobile device at a time T3; notifying the second mobile device about an unsuccessful attempt of establishing a second call with the first mobile device; registering, at the network subsystem, an unsuccessful second call attempt between the second mobile device and the first mobile device at a time T3; verifying whether there occurred a simultaneous or substantially simultaneous calls situation between the first call and the second call; establishing a network initiated call between the first mobile device and the second mobile device when there occurred a simultaneous or substantially simultaneous calls situation between the first call and the second call.

Preferably, during the registering step call parties identifiers are registered as well as a time of the call attempt.

Preferably, the verifying step establishes whether the time T3 falls between the time T0 and a time T2, which is a time when the first mobile device returns to normal operation after initiating the first call.

Preferably, prior to establishing the network initiated call between the first mobile device and the second mobile device, notifying the first and second mobile devices that the network subsystem will attempt to establish a connection between respective mobile devices.

Preferably, after the notification step the first mobile device and the second mobile device are locked from accepting other calls than the network initiated redial call.

There is also presented computer software comprising program code means for performing all the steps of the computer-implemented method described above when said program is run on a computer.

Yet, there is also presented a computer readable recording medium storing computer-executable instructions performing all the steps of the computer-implemented method described above when executed on a computer.

There is further presented an apparatus for network initiated redial comprising a mobile switching center configured to receive, at a network subsystem, from a first mobile device a request to establish a first call with a second mobile device at a time T0; the mobile switching center being further configured to notify the first mobile device about an unsuccessful attempt of establishing the first call with the second mobile device; the apparatus further comprising the mobile switching center configured to register, in an unsuccessful calls database, an unsuccessful first call attempt between the first mobile device and the second mobile device at a time T0; the mobile switching center configured to receive, at a network subsystem, from the second mobile device a request to establish a second call with the first mobile device at a time T3; the mobile switching center configured to notify the second mobile device about an unsuccessful attempt of establishing a second call with the first mobile device; the mobile switching center configured to register, in the unsuccessful calls database, an unsuccessful second call attempt between the second mobile device and the first mobile device at a time T3; the unsuccessful calls database connected to a simultaneous calls detector configured to verify whether there occurred a simultaneous or substantially simultaneous calls situation between the first call and the second call; a redial module configured to notify the mobile switching center to establish a network initiated call between the first mobile device and the second mobile device when the simultaneous calls detector detects that there occurred a simultaneous or substantially simultaneous calls situation between the first call and the second call.

Preferably, the simultaneous calls detector establishes whether the time T3 falls between the time T0 and a time T2, which is a time when the first mobile device returns to normal operation after initiating the first call.

Preferably, that prior to establishing the network initiated call between the first mobile device and the second mobile device, the mobile switching center is configured to notify the first and second mobile devices that the network subsystem will attempt to establish a connection between respective mobile devices.

BRIEF DESCRIPTION OF DRAWINGS

These and other objects of the apparatus and method presented herein are accomplished by providing an apparatus and method for network initiated redial. Further details and features of the presented apparatus and method, its nature and various advantages will become more apparent from the following detailed description of the preferred embodiments shown in a drawing, in which.

DETAILED DESCRIPTION OF THE PREFERRED EMBODIMENTS

Figure 1:
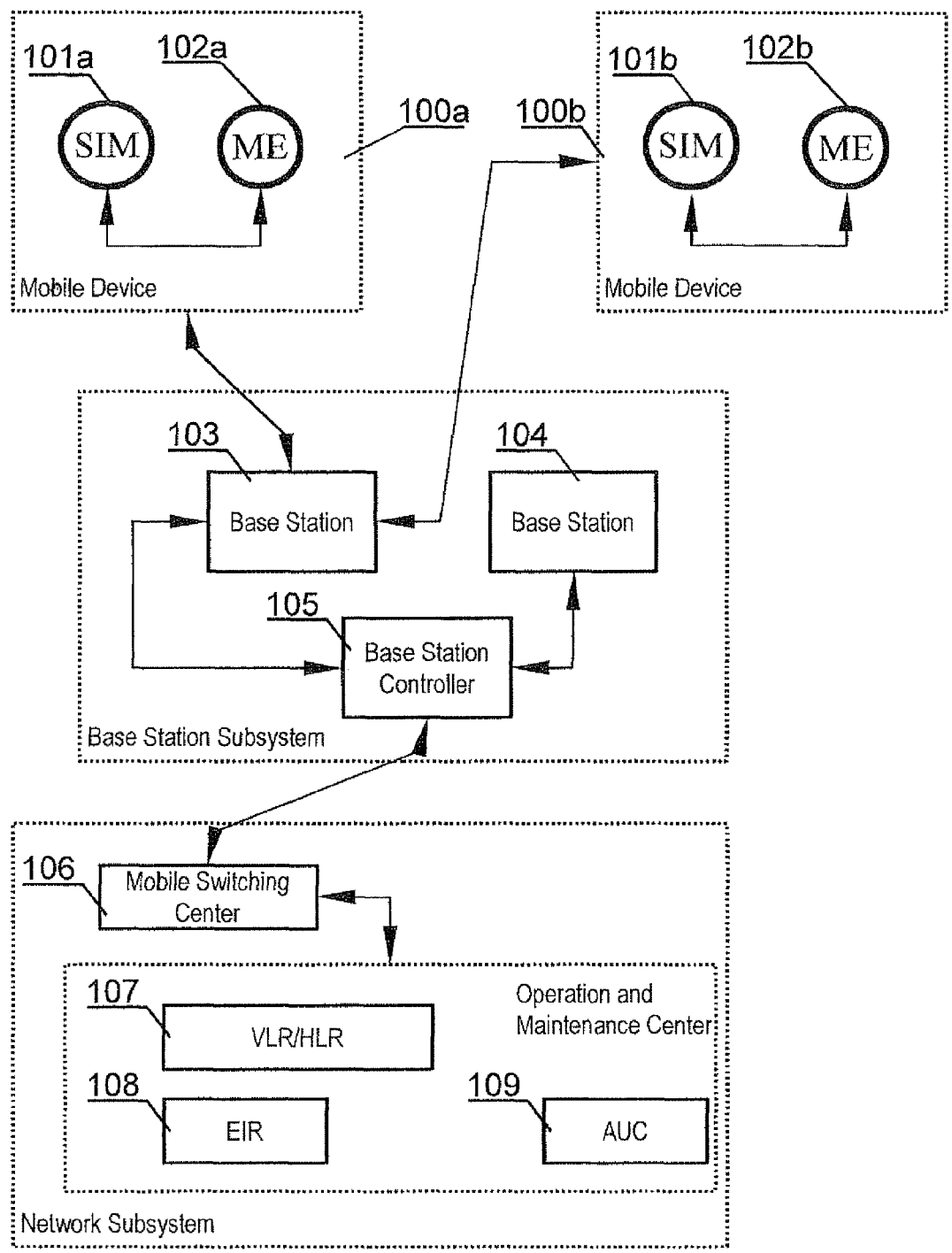
FIG. 1 shows an exemplary cellular network diagram.

FIG. 1 shows an exemplary cellular telephony network diagram. The concept will be shown in an exemplary embodiment applied to and discussed with reference to a cellular telephony network. It will however be evident that the same principles may be readily applied to Internet Protocol telephony or the like.

A mobile device 100a, 100b communicates with other components of a network by means of a communication channel, typically wireless. The wireless communication may be one of GSM, CDMA, Wi-Fi, WiMAX or other wide area network (WAN) technology. The mobile device 100a, 100b comprises a mobile equipment (ME) 102a, 102b—a physical mobile device that includes a radio transceiver (typical smartphone or an ip-phone or a personal computer) and the like and subscriber identity module (SIM) 101a, 101b. The mobile devices will remain generic mobile devices until a SIM 101a, 101b is inserted, allowing for personalization of the mobile device and services.

A base station subsystem (BSS) comprises a base station controller 105 and one or more base transceiver stations (BTS) 103, 104. It may also have equipment for encrypting and decrypting communications. Each BTS 103, 104 defines a single cell, includes a radio antenna, a radio transceiver and a link to the base station controller (BSC) 105. The BSC 105 reserves radio frequencies, manages call handoff of mobile devices 100a, 100b from one cell to another cell within BSS, and controls paging.

A BSC 105 additionally communicates with a network subsystem that provides link between cellular network and another network such as PSTN, controls handoffs between cells in different BSSs, authenticates users and validates accounts, enables worldwide roaming of mobile users.

The central element of the network subsystem is the mobile switching center (MSC) 106. The mobile switching center (MSC) 106 is the primary service delivery node for GSM/CDMA, responsible for routing voice calls and SMS as well as other services (such as conference calls, FAX and circuit switched data). The Mobile Switching Center (MSC) 106 communicates with (a) a home location register (HLR) database, which stores information about each subscriber that belongs to it, with (b) a visitor location register (VLR) database 107, which maintains information about subscribers currently physically in the covered region, (c) an authentication center 109 database (AuC) used for user and service authentication that also has access to encryption keys, (d) an equipment identity register database (EIR) 108 that keeps track of the type of equipment that exists at a mobile device 100a, 100b.

These different modules allow for managing an operation and maintenance center.

A GSM network uses a set of protocols to communicate between different elements. Therefore, such a GSM network is a family of data communication protocols. Any protocol stack for data communication, for example TCP/IP (Transmission Control Protocol/Internet Protocol), can be implemented. GSM protocol architecture comprises three independent layers: a user layer, a control layer and a management layer.

The user layer defines protocols to carry connection oriented voice and user data. The control layer defines a set of protocols for controlling these connections with signalling information, for example signalling for connection setup. The management layer function are functions related to the system as a whole including layer coordination, functions related to resources and parameters residing in the layers of the control and/or user layer.

Different protocols provide different specific functions such as: radio resource management, mobility management, connection management, mobile application part (MAP), BTS management.

Implementation of all these functions allows to communicate two mobile devices together, to issue information regarding availability of a mobile device for a call, sending 'busy' messages, identifying subscribers.

The presented solution in one of its embodiments will enhance existing signalling in GSM networks.

With the introduction of a mechanism of automatic connection of two callers, who call each other at the same or very similar time, one avoids frequent calling that may be unsuccessful and a mobile operator will realize additional revenue per call, which without this particular mechanism would not be held or would be held later.

Figure 2:
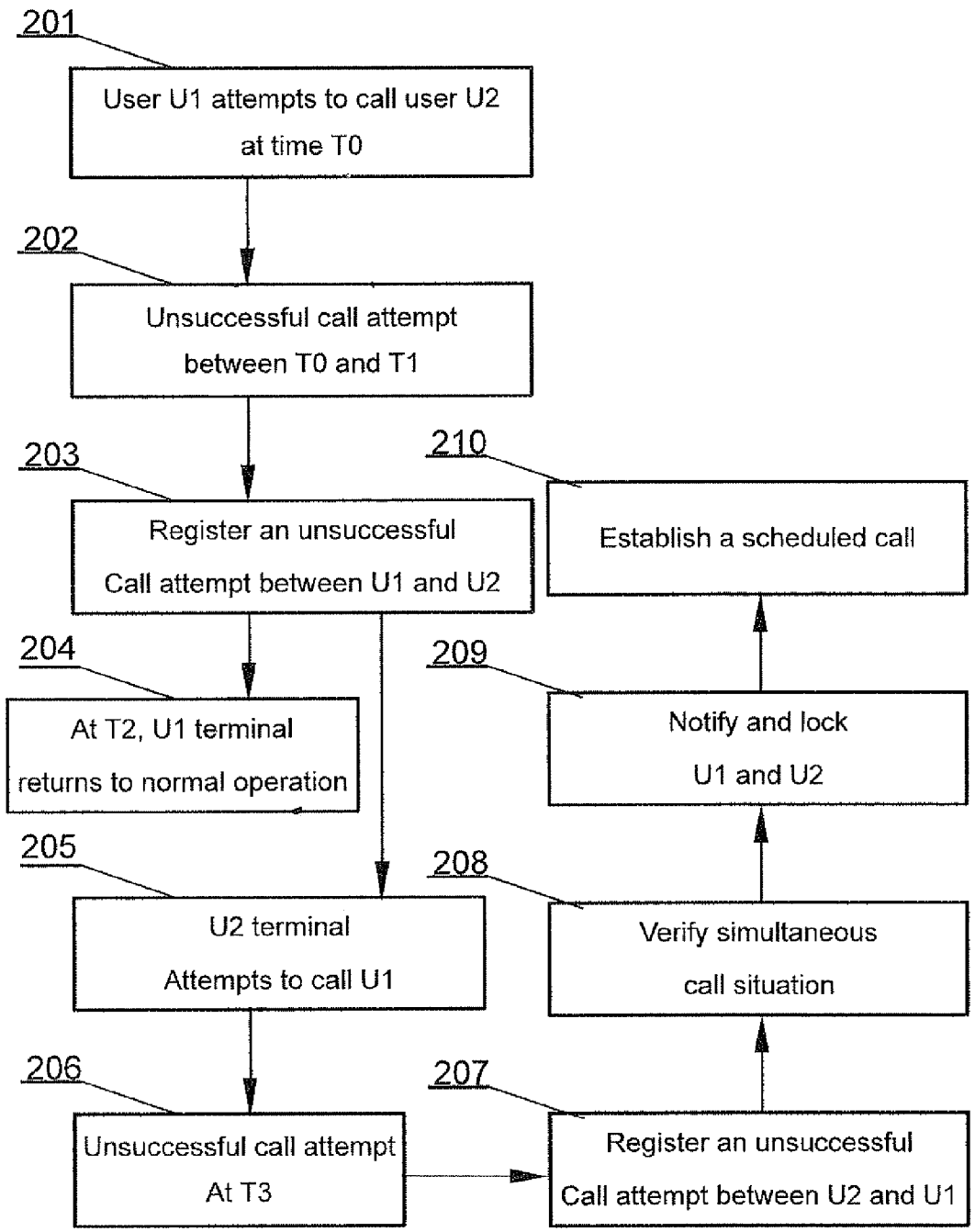
FIG. 2 shows a diagram of the method.

FIG. 2 shows a diagram of the method. The process starts at a time T0 when a user or a mobile device U1 attempts to establish a call with a user or a mobile device U2 201. It is to be understood that a call may be initiated manually or automatically. The aforementioned attempt means that a network system is notified about a request to establish a call between the two respective users/mobile devices.

Next, at step 202, U1 is notified about an unsuccessful attempt of establishing a call with U2. U1 will receive a 'not busy' signalling, a 'busy' signalling or a voicemail message.

Further, at step 203, an unsuccessful call attempt is registered, preferably at a network subsystem. Call parties (preferably their identifiers) are registered as well as a time of the call attempt. Subsequently, at step 204, U1 mobile device returns at T2 to normal operation i.e. becomes idle and may receive another call (this time may be in the range of 3 seconds).

Following step 204, at step 205 U2 mobile device attempts to call U1 and is notified at step 206 that the call at T3 is unsuccessful. It is to be understood that T3 may occur before T2. Further, at step 207, an unsuccessful call attempt is registered, preferably at a network subsystem. Call parties are registered as well as a time of the call attempt. Subsequently, at step 208, the network subsystem verifies whether there has happened a simultaneous or substantially simultaneous, unsuccessful call situation i.e. whether the registered T3 falls between T0 and T2.

If there has happened a simultaneous unsuccessful call situation, the network subsystem notifies 209 the U1 and U2 mobile devices/users that such a situation has occurred and that the network subsystem will attempt to establish the connection. The notifications made with a use of appropriate signalling message provided via previously described GSM signalling protocols known to a person skilled in the art. Such notification may also be presented to users via notification means such as playing a tone, vibrations, displaying a message.

U1 and U2 may at that time be locked from accepting other calls. Finally, at step 210 a call is established between U1 and U2 obviating the need for further calls between U1 and U2, which in the past would require more time and would frequently still be unsuccessful.

A network operator may gain further revenue and appropriately define his charges for this service, such as: (a) charge only U1 as a first calling party, (b) charge U1 and U2 at 50%, (c) charge U1 and U2 for a normal call, (d) charge a fixed fee for the service.

Figure 3:
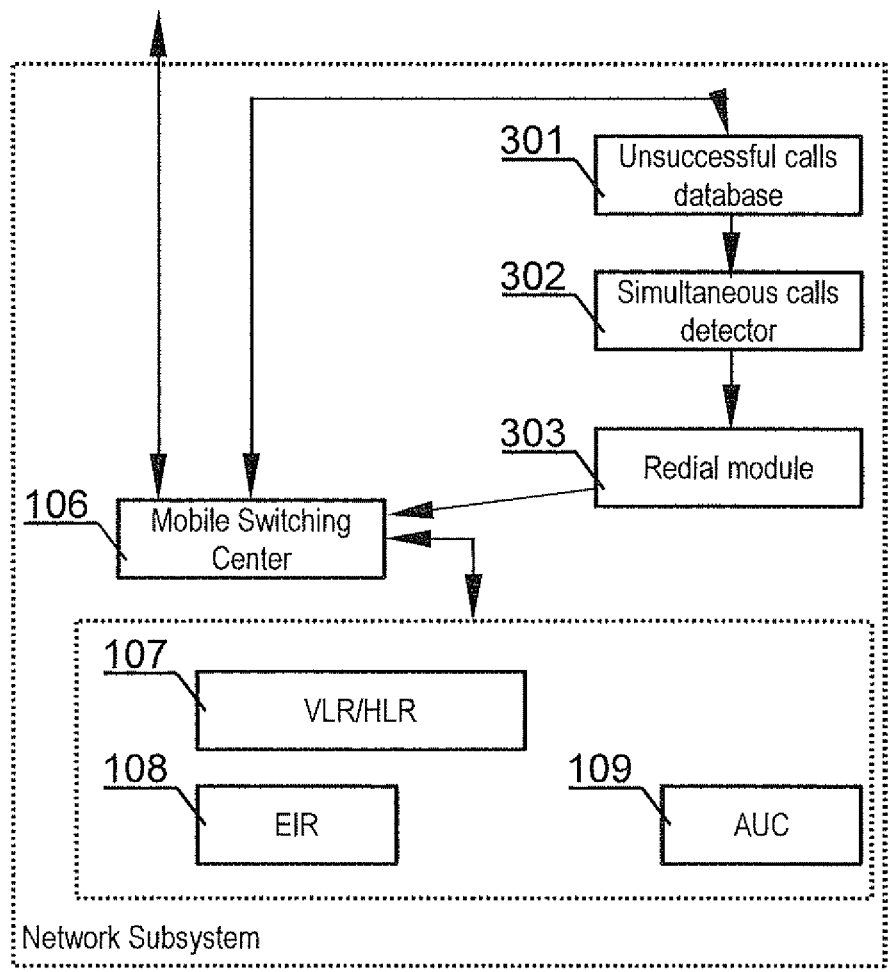
FIG. 3 shows a diagram of the apparatus.

FIG. 3 shows a diagram of the apparatus. A standard network subsystem, such as the one described with reference to FIG. 1, is enhanced with several modules allowing for detection and handling of substantially simultaneous calls. The mobile switching center 106 communicates with unsuccessful calls database 301 in order to store there data relating to missed calls and their timing. It is sufficient to store data unambiguously identifying a mobile device (or SIM) and time at which dialing was present (T0, T1). Time T2 may also be stored. However, this time may be network and mobile device dependent. In order for the T2 to be most precise, a mobile device may provide the network subsystem with the exact value of T2 so that the value may be stored at the network subsystem. In case this time is not explicitly provided, it may be estimated at the network subsystem by taking into account network properties as well as mobile device properties.

A simultaneous calls detector 302 shall upon entering new data into the unsuccessful calls database 301, verify whether the presently entered unsuccessful call was made during the other party was dialing. For example a record describing an unsuccessful call between U2 and U1 is entered with a dialing start time 12:41:23 and dialing duration 10 seconds. The simultaneous calls detector 302 will look, in the unsuccessful calls database 301, for a call between U1 and U2, wherein the dialing was still active at 12:41:23. This would mean that the call of U2 to U1 is substantially simultaneous as the call from U1 to U2.

When it is determined that a substantially simultaneous call is present, preferably immediately, a redial module 303 is notified that a call between U1 and U2 shall be established.

For this purpose, the redial module notifies the mobile switching center and preferably sends special signalling information to U1 and U2, upon reception of which U1 and U2 will await a redial call and not respond to other calls in order to make the redial happen.

As can be readily seen this is a very effective solution that saves both time of users and bandwidth of the network.

It can be easily recognized, by one skilled in the art, that the aforementioned a computer-implemented method for network initiated redial may be performed and/or controlled by one or more computer programs. Such computer programs are typically executed by utilizing the computing resources in a computing device such as personal computers, personal digital assistants, cellular telephones, receivers and decoders of digital television or the like. Applications are stored in non-volatile memory, for example a flash memory or volatile memory, for example RAM and are executed by a processor. These memories are exemplary recording media for storing computer programs comprising computer-executable instructions performing all the steps of the computer-implemented method according the technical concept presented herein.

While the concept presented herein has been depicted, described, and has been defined with reference to particular preferred embodiments, such references and examples of implementation in the foregoing specification do not imply any limitation on the concept. It will, however, be evident that various modifications and changes may be made thereto without departing from the broader scope of the technical concept. The presented preferred embodiments are exemplary only, and are not exhaustive of the scope of the technical concept presented herein.

Accordingly, the scope of protection is not limited to the preferred embodiments described in the specification, but is only limited by the claims that follow. Any combination of the appended claims in envisaged in the present application.

The invention claimed is:

1. A method for network initiated redial comprising the steps of:
  receiving, at a network subsystem, from a first mobile device a request to establish a first call with a second mobile device at a time T0;
  notifying the first mobile device about an unsuccessful attempt of establishing the first call with the second mobile device;
  registering, at the network subsystem, an unsuccessful first call attempt between the first mobile device and the second mobile device at a time T0;

receiving, at the network subsystem, from the second mobile device a request to establish a second call with the first mobile device at a time T3;

notifying the second mobile device about an unsuccessful attempt of establishing the second call with the first mobile device;

registering, at the network subsystem, the unsuccessful second call attempt between the second mobile device and the first mobile device at a time T3;

verifying whether there occurred a simultaneous or substantially simultaneous calls situation between the first call and the second call;

notifying the first and second mobile devices that the network subsystem will attempt to establish a connection between respective mobile devices;

locking the first mobile device and the second mobile device from accepting other calls than the network initiated redial call;

establishing a network initiated call between the first mobile device and the second mobile device when there occurred a simultaneous or substantially simultaneous calls situation between the first call and the second call.

2. The method according to claim 1 wherein during the registering step (203, 207) call parties identifiers are registered as well as a time of the call attempt.

3. The method according to claim 1 wherein the verifying step establishes whether the time T3 falls between the time T0 and a time T2, which is a time when the first mobile device returns to normal operation after initiating the first call.

4. A non-volatile computer readable memory storing computer-executable instructions performing all the steps of the computer-implemented method according to claim 1 when executed on a computer.

5. An apparatus for network initiated redial comprising
a mobile switching center configured to receive, at a network subsystem, from a first mobile device a request to establish a first call with a second mobile device at a time T0;

the mobile switching center being further configured to notify the first mobile device about an unsuccessful attempt of establishing the first call with the second mobile device;

wherein:
the mobile switching center is configured to register, in an unsuccessful calls database, the unsuccessful first call attempt between the first mobile device and the second mobile device at a time T0;

the mobile switching center is configured to receive, at the network subsystem, from the second mobile device a request to establish a second call with the first mobile device at a time T3;

the mobile switching center is configured to notify the second mobile device about an unsuccessful attempt of establishing a second call with the first mobile device;

the mobile switching center is configured to register, in the unsuccessful calls database, the unsuccessful second call attempt between the second mobile device and the first mobile device at a time T3;

the unsuccessful calls database is connected to a simultaneous calls detector configured to verify whether there occurred a simultaneous or substantially simultaneous calls situation between the first call and the second call;

a redial module configured to notify the mobile switching center to establish a network initiated call between the first mobile device and the second mobile device when the simultaneous calls detector detects that there occurred a simultaneous or substantially simultaneous calls situation between the first call and the second call;

wherein prior to establishing the network initiated call between the first mobile device and the second mobile device, the mobile switching center is configured to notify the first and second mobile devices that the network subsystem will attempt to establish a connection between respective mobile devices and instruct the first mobile device and the second mobile device to lock from accepting other calls than the network initiated redial call.

6. The apparatus according to claim 5 wherein the simultaneous calls detector establishes whether the time T3 falls between the time T0 and a time T2, which is a time when the first mobile device returns to normal operation after initiating the first call.

* * * * *